United States Patent
Karthikeyan et al.

(10) Patent No.: US 11,075,843 B2
(45) Date of Patent: Jul. 27, 2021

(54) MODEL MANAGEMENT IN A DYNAMIC QOS ENVIRONMENT

(71) Applicant: BRITISH TELECOMMUNICATIONS PUBLIC LIMITED COMPANY, London (GB)

(72) Inventors: Vidhyalakshmi Karthikeyan, London (GB); Detlef Nauck, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 261 days.

(21) Appl. No.: 15/740,842

(22) PCT Filed: Jun. 30, 2016

(86) PCT No.: PCT/EP2016/065432
§ 371 (c)(1),
(2) Date: Dec. 29, 2017

(87) PCT Pub. No.: WO2017/001630
PCT Pub. Date: Jan. 5, 2017

(65) Prior Publication Data
US 2018/0191619 A1    Jul. 5, 2018

(30) Foreign Application Priority Data

Jun. 30, 2015 (EP) .................................... 15275166
Sep. 28, 2015 (EP) .................................... 15187163
(Continued)

(51) Int. Cl.
*H04L 29/08* (2006.01)
*G06F 17/30* (2006.01)
(Continued)

(52) U.S. Cl.
CPC .......... *H04L 47/24* (2013.01); *H04L 41/5009* (2013.01); *H04L 45/302* (2013.01); *H04L 47/76* (2013.01); *H04L 47/805* (2013.01)

(58) Field of Classification Search
CPC ..... H04L 47/24; H04L 47/76; H04L 41/5009; H04L 47/805; H04L 45/302
(Continued)

(56) References Cited

U.S. PATENT DOCUMENTS 6,154,778 A    11/2000  Koistinen et al.
6,631,135 B1   10/2003  Wojcik
(Continued)

FOREIGN PATENT DOCUMENTS

EP    1 016 261    7/2000
EP    1 374 486    1/2004
(Continued)

OTHER PUBLICATIONS

Office Action dated Nov. 13, 2019 issued in U.S. Appl. No. 15/740,832 (12 pgs.).
(Continued)

*Primary Examiner* — Moustafa M Meky
*Assistant Examiner* — Elizabeth Kassa
(74) *Attorney, Agent, or Firm* — Nixon & Vanderhye P.C.

(57) ABSTRACT

The present invention provides a computer implemented method for allocating resources to Quality of Service, QoS, models in a network, the method comprising: selecting a route in the network, wherein the route comprises a plurality of flows of network traffic; obtaining model-to-route mapping data identifying a plurality of QoS models, wherein each QoS model is used by at least one of the plurality of flows of network traffic; monitoring the plurality of flows of network traffic to determine a characteristic of each of the plurality of flows; and in the event that one of the QoS
(Continued)

models is withdrawn, reallocating resources of the selected route to flows of network traffic along that route, wherein the reallocation is based on at least one of: the QoS model used by each of the flows of network traffic along that route; and the characteristic of each of the flows.

17 Claims, 8 Drawing Sheets

(30) Foreign Application Priority Data

| Sep. 30, 2015 | (EP) | ................................... | 15187813 |
|---|---|---|---|
| Mar. 24, 2016 | (EP) | ................................... | 16162446 |
| Mar. 24, 2016 | (EP) | ................................... | 16162447 |
| Mar. 24, 2016 | (EP) | ................................... | 16162448 |
| Mar. 24, 2016 | (EP) | ................................... | 16162449 |
| Mar. 24, 2016 | (EP) | ................................... | 16162451 |
| Mar. 29, 2016 | (EP) | ................................... | 16162678 |
| Jun. 24, 2016 | (EP) | ................................... | 16162450 |

(51) Int. Cl.

| G06F 11/34 | (2006.01) |
|---|---|
| G06F 11/30 | (2006.01) |
| H04L 12/851 | (2013.01) |
| H04L 12/725 | (2013.01) |
| H04L 12/927 | (2013.01) |
| H04L 12/24 | (2006.01) |
| H04L 12/917 | (2013.01) |

(58) Field of Classification Search

USPC ........................................................ 709/223

See application file for complete search history.

(56) References Cited

U.S. PATENT DOCUMENTS

| 6,690,929 | B1 | 2/2004 | Yeh | |
|---|---|---|---|---|
| 7,668,946 | B1 | 2/2010 | Garcia-Franco et al. | |
| 7,715,312 | B2 | 5/2010 | Khasnabish | |
| 8,073,455 | B1 | 12/2011 | Xie et al. | |
| 8,797,867 | B1 | 8/2014 | Chen et al. | |
| 9,936,406 | B2 | 4/2018 | Andersson et al. | |
| 2001/0013067 | A1 | 8/2001 | Koyanagi et al. | |
| 2002/0174227 | A1 | 11/2002 | Hartsell | |
| 2003/0112762 | A1 | 6/2003 | Hasan Mahmoud et al. | |
| 2003/0202536 | A1* | 10/2003 | Foster | H04L 49/357 370/469 |
| 2004/0028054 | A1 | 2/2004 | Khurana et al. | |
| 2004/0120705 | A1 | 6/2004 | Friskney et al. | |
| 2005/0058069 | A1* | 3/2005 | Dauchy | H04L 45/00 370/230 |
| 2005/0083762 | A1 | 4/2005 | Rui et al. | |
| 2005/0102414 | A1 | 5/2005 | Hares et al. | |
| 2006/0029096 | A1* | 2/2006 | Babbar | H04W 28/24 370/466 |
| 2006/0187817 | A1 | 8/2006 | Charzinski et al. | |
| 2006/0268908 | A1* | 11/2006 | Wang | H04L 41/046 370/401 |
| 2007/0230363 | A1 | 10/2007 | Buskens et al. | |
| 2007/0268827 | A1 | 11/2007 | Csaszar | |
| 2008/0008091 | A1 | 1/2008 | Yumoto | |
| 2008/0065318 | A1 | 3/2008 | Ho | |
| 2008/0232247 | A1 | 9/2008 | Evans | |
| 2009/0245130 | A1 | 10/2009 | Bing | |
| 2010/0027517 | A1* | 2/2010 | Bonta | H04L 45/22 370/338 |
| 2010/0100525 | A1 | 4/2010 | Huang | |
| 2010/0214920 | A1 | 8/2010 | Tewani et al. | |
| 2010/0254265 | A1 | 10/2010 | Kempe | |
| 2010/0265826 | A1 | 10/2010 | Khasnabish | |
| 2011/0044262 | A1 | 2/2011 | Satapathy et al. | |
| 2011/0087522 | A1 | 4/2011 | Beaty et al. | |
| 2011/0213738 | A1 | 9/2011 | Sen et al. | |
| 2013/0144550 | A1 | 6/2013 | Czompo | |
| 2013/0275567 | A1 | 10/2013 | Karthikeyan et al. | |
| 2013/0275589 | A1 | 10/2013 | Karthikeyan et al. | |
| 2013/0311673 | A1* | 11/2013 | Karthikeyan | H04L 45/42 709/239 |
| 2014/0046880 | A1 | 2/2014 | Breckenridge | |
| 2014/0052850 | A1 | 2/2014 | Doorhy et al. | |
| 2015/0074283 | A1 | 3/2015 | Karthikeyan et al. | |
| 2015/0098338 | A1 | 4/2015 | Bhattacharya | |
| 2015/0332155 | A1 | 11/2015 | Mermoud | |
| 2015/0381648 | A1 | 12/2015 | Mathis | |
| 2016/0171398 | A1 | 6/2016 | Eder | |
| 2016/0344604 | A1* | 11/2016 | Raleigh | G06F 9/54 |
| 2018/0191606 | A1 | 7/2018 | Karthikeyan et al. | |
| 2018/0191621 | A1 | 7/2018 | Karthikeyan et al. | |
| 2018/0191635 | A1 | 7/2018 | Karthikeyan et al. | |

FOREIGN PATENT DOCUMENTS

| EP | 1 401 161 | 3/2004 |
|---|---|---|
| EP | 1 453 256 | 8/2005 |
| EP | 1 248 431 | 10/2007 |
| EP | 1 993 231 | 11/2008 |
| EP | 2 151 951 | 2/2010 |
| EP | 2 261 811 | 12/2010 |
| EP | 2 469 756 | 6/2012 |
| EP | 1 875 693 | 8/2012 |
| WO | 99/14931 | 3/1999 |
| WO | 02/080458 A1 | 10/2002 |
| WO | 2006/116308 | 11/2006 |
| WO | 2011/076282 | 6/2011 |
| WO | 2012/085520 | 6/2012 |
| WO | 2012/085521 | 6/2012 |
| WO | 2013/144550 | 10/2013 |
| WO | 2014/068268 | 5/2014 |
| WO | 2014/068270 | 5/2014 |
| WO | 2015/175260 A1 | 11/2015 |
| WO | 2017/001628 | 1/2017 |
| WO | 2017/001629 | 1/2017 |

OTHER PUBLICATIONS

Office Action dated Nov. 13, 2019 issued in U.S. Appl. No. 15/740,837 (11 pgs.).
Advisory Action dated Oct. 8, 2019, issued in U.S. Appl. No. 15/740,520 (3 pages).
U.S. Appl. No. 15/740,832, filed Dec. 29, 2017 (29 pages).
International Search Report and Written Opinion issued in PCT/EP2016/065434 dated Oct. 6, 2016 (15 pages).
Valikannu "A Novel Energy Consumption Model using Residual Energy Based Mobile Agent Selection Scheme (REMA) in MANETs", 2015 2$^{nd}$ International Conference on Signal Processing and Integrated Networks (SPIN), Noida, India. Pub., IEEE, Feb. 19-20, 2015 (6 pages).
GB Search Report issued in GB1517349.5, dated May 26, 2016 (6 pages).
Balaraman, "Business Data Mining and Decision Making Application of Data Mining in the Telecommunication Industry" Term paper, Quantitative Methods & Information Systems, Indian Institute of Management Bangalore, Oct. 22, 2011 (23 pages).
International Search Report and Written Opinion of PCT/EP2016/065429, dated Sep. 5, 2016 (16 pages).
Search Report dated Apr. 28, 2016 issued in GB1517110.1 (7 pages).
International Search Report and Written Opinion of the International Searching Authority dated Sep. 23, 2016, issued in International Application No. PCT/EP2016/065431 (15 pages).
U.S. Appl. No. 15/740,837 filed Dec. 29, 2017 (33 pgs).
Extended European Search Report dated Nov. 26, 2015 issued in European Application No. 15275166.5 (5 pgs).
Tanja Zseby and Sebastian Zander, "Sampling Schemes for Validating Service Level Agreements", Centre for Advanced Internet Architectures, CAIA Technical Report 040706A, Jul. 2004 (6 pgs.).

(56) References Cited

OTHER PUBLICATIONS

Zhengdong Gao and Gengfeng Wu, "Combining QoS-based Service Selection with Performance Prediction", School of Computer Engineering and Science, Shanghai University, Proceedings of the 2005 IEEE International Conference on e-Business Engineering (ICEBE'05); 2005 (4 pgs.).
U.S. Appl. No. 15/740,520, filed Dec. 28, 2017 (29 pages).
Office Action dated Apr. 19, 2019 issued in U.S. Appl. No. 15/740,837 (14 pages).
Office Action dated Oct. 17, 2018 issued in U.S. Appl. No. 15/740,837 (11 pages).
Advisory Action dated Aug. 2, 2019 issued in U.S. Appl. No. 15/740,837 (4 pages).
Office Action dated Apr. 19, 2019 issued in U.S. Appl. No. 15/740,832 (12 pages).
Office Action dated Oct. 17, 2018 issued in U.S. Appl. No. 15/740,832 (11 pages).
Office Action dated Nov. 2, 2018 issued in U.S. Appl. No. 15/740,520 (13 pages).
Office Action dated May 30, 2019 issued in U.S. Appl. No. 15/740,520 (16 pages).
International Search Report and Written Opinion of the International Searching Authority dated Oct. 10, 2016 issued in PCT/EP2016/065432 (15 pgs.).
Search Report dated Nov. 30, 2016 issued in GB1605275.5 (4 pgs.).
Fabricio Carvalho de Gouveia and Thomas Magedanz, "Quality of Service in Telecommunication Networks", Technical University of Berlin, Franklinstr., Berlin, Germany, Telecommunication Systems and Technologies—vol. II, 2009 (8 pgs.)
E. Crawley et al., "A Framework for QoS-based Routing in the Internet", Network Working Group, Request for Comments: 2386, Memo, Aug. 1998 (37 pgs.).
Jari Koistinen and Aparna Seetharaman, Worth-Based Multi-Category Quality-of-Service Negotiation in Distributed Object Infrastructures, Software Technology Laboratory, Hewlett Packard, Jul. 1998 (18 pgs.)
Examination Report issued in EP Application No. 16 733 597.5 dated Sep. 12, 2019 (9 pages).
Ananya DAS "Maximizing Profit Using SLA-Aware Provisioning", 2012 IEEE Network Operations and Management Symposium (NOMS), Math & Computer Science Department, Lake Forest College, Apr. 16, 2012 (8 pages).
Office Action dated Mar. 4, 2020 issued in U.S. Appl. No. 15/740,520 (19 pgs.).
Office Action dated Mar. 31, 2021 issued in U.S. Appl. No. 15/740,520 (23 pages).

\* cited by examiner

| Prototype Vector | Jitter | Loss | Delay |
|---|---|---|---|
| $p_1$ | 3.01 | 0.1506 | 24.82 |
| $p_2$ | 4.00 | 0.1003 | 29.76 |
| $p_3$ | 2.50 | 0.1995 | 19.90 |

Fig. 2A

| Confidence Vector | Jitter | Loss | Delay |
|---|---|---|---|
| $c_1$ | 0.0280 | 0.0015 | 0.2193 |
| $c_2$ | 0.0395 | 0.0008 | 0.2235 |
| $c_3$ | 0.0211 | 0.0017 | 0.1905 |

Fig. 2B

| | Base Data | | | | Global Statistics | | | | |
|---|---|---|---|---|---|---|---|---|---|
| ID | Prototype | Global Confidence | Created | Capacity [Mb/s] | Routes | Peak Flows | Peak Demand [Mb/s] | 1hr Flows | ... |
| 1 | (3.1, 0.1521, 25.15) | (0.0280, 0.0015, 0.2193) | 20/03/2014 12:00 | 200 | 3 | 24 | 153 | 13 | ... |
| 2 | (4.00, 0.1003, 29.76) | (0.0395, 0.0008, 0.2235) | 20/03/2014 14:00 | 150 | 3 | 0 | 0 | 0 | ... |
| 3 | (2.50, 0.1995, 19.90) | (0.0211, 0.0017, 0.1905) | 20/03/2014 14:00 | 300 | 3 | 0 | 0 | 0 | ... |
| ... | ... | ... | ... | | ... | ... | ... | ... | ... |

Fig. 2C

| | Base Data | | | | Route-based Statistics | | |
|---|---|---|---|---|---|---|---|
| Route | Model ID | Route Confidence | Active since | Capacity [Mb/s] | Peak Flows | Peak Demand [Mb/s] | ... |
| 1 | 1 | (0.0280, 0.0015, 0.2193) | 20/03/2014 12:00 | 100 | 8 | 82 | |
| 2 | 1 | (0.0280, 0.0015, 0.2193) | 20/03/2014 12:00 | 50 | 9 | 48 | |
| 3 | 1 | (0.0280, 0.0015, 0.2193) | 20/03/2014 12:00 | 50 | 7 | 23 | |
| 4 | 2 | (0.0395, 0.0008, 0.2235) | 20/03/2014 14:00 | 200 | 0 | 0 | ... |
| ... | ... | ... | ... | | ... | ... | ... |
| 9 | 3 | (0.0211, 0.0017, 0.1905) | 20/03/2014 14:00 | 100 | 0 | 0 | ... |
| ... | ... | ... | ... | | ... | ... | ... |

| Model ID | Time | Breaches | Better | Within | Drifted | Volatile |
|---|---|---|---|---|---|---|
| … | … | … | … | … | … | … |
| 1 | 15:00 | 0 | 3 | 12 | 0 | 0 |
| 1 | 16.00 | 2 | 5 | 5 | 0 | 1 |
| … | … | … | … | … | … | … |

Fig. 6

| Model | Routes | Avg. data amount[GB]/h | Avg. data amount per route/h | % traffic congested |
|---|---|---|---|---|
| M1 | 10 | 100 | 10 | 10% |
| M2 | 2 | 30 | 15 | 5% |
| M3 | 12 | 120 | 10 | 15% |
| M4 | 20 | 100 | 5 | 20% |
| M5 | 15 | 60 | 4 | 5% |
| M6 | 5 | 20 | 4 | 10% |

MODEL MANAGEMENT IN A DYNAMIC QOS ENVIRONMENT

This application is the U.S. national phase of International Application No. PCT/EP2016/065432 filed 30 Jun. 2016, which designated the U.S. and claims priority to EP Patent Application No. 15275166.5 filed 30 Jun. 2015, EP Patent Application No. 15187163.9 filed 28 Sep. 2015, EP Patent Application No. 15187813.9 filed 30 Sep. 2015, EP Patent Application No. 16162446.5 filed 24 Mar. 2016, EP Patent Application No. 16162449.9 filed 24 Mar. 2016, EP Patent Application No. 16162451.5 filed 24 Mar. 2016, EP Patent Application No. 16162450.7 filed 24 Mar. 2016, EP Patent Application No. 16162448.1 filed 24 Mar. 2016, EP Patent Application No. 16162447.3 filed 24 Mar. 2016, and EP Patent Application No. 16162678.3 filed 29 Mar. 2016, the entire contents of each of which are hereby incorporated by reference.

TECHNICAL FIELD

The present disclosure relates to network communications, and in particular to routing in packet switched networks, and still more particularly to the routing of packets and the provision of Quality of Service, QoS, for packets transmitted over a computer network.

BACKGROUND

As the volume of traffic transmitted on packet switched networks has increased, and the types of traffic transmitted over such networks has broadened to include traffic types that rely upon low latency transmission over the network, such as voice or streaming media, it has become increasingly important to enable proactive management of the traffic on the network.

Quality of service models enable differentiated handling of different types of network traffic. The integrated services, Intserv, architecture is designed to guarantee a particular quality of service for the transmission of a stream of packets across a network. Prior to transmission of a stream of packets, Intserv requires that an originating network component reserves resources in each router through which the stream of packets will pass. This resource reservation, usually requested using RSVP (Resource Reservation Protocol), ensures that each router in the path has the necessary resources to guarantee transmission of the packet stream at a particular QoS prior to transmission of the packet stream. However, the IntServ system does not scale easily, since it quickly becomes difficult for the network components to manage the reservations.

An alternative approach is the differentiated services, Diffserv, computer networking architecture enables the network to classify the traffic into one of a specified and predetermined number of traffic classes. A differentiated services, DS, field is populated in each packet transmitted across the network and the field indicates to the network the quality of service, QoS, that is to be provided to that packet in its transmission between network components. The DiffServ model can be used to provide low-latency transmission of critical network traffic, such as streaming packets or voice-over-IP packets, across a network. Packets not marked with a prioritised packet code, such as email and web traffic, can be transmitted when the network components have capacity to do so.

SUMMARY

The present disclosure relates to methods and apparatus for allocating resources to Quality of Service, QoS, models in a network. Methods and apparatus are also disclosed which intelligently reallocate resources reserved for QoS models based on one or more of: client demand, features of those QoS models, performance of traffic flows which use those QoS models, and desired traffic features. Aspects and examples of the invention are set out in the claims.

Described herein are methods for allocating resources, such as bandwidth, on a route through a network which may be shared by a number of flows of traffic. This allocation shares the resources provided by the route between the flows of network traffic which use it. The division of resources may be determined based on the QoS Models used by each of the flows, and/or based on other characteristics of those flows such as the type of traffic carried by the flow or a desirability of that traffic.

Accordingly, an aspect of the disclosure provides a method for allocating resources to Quality of Service, QoS, models in a network, the method comprising: selecting a route in the network, wherein the route comprises a plurality of flows of network traffic; obtaining model-to-route mapping data identifying a plurality of QoS models, wherein each QoS model is used by at least one of the plurality of flows of network traffic; monitoring the plurality of flows of network traffic to determine a characteristic of each of the plurality of flows; and, in the event that one of the QoS models is withdrawn, reallocating resources of the selected route to flows of network traffic along that route, wherein the reallocation is based on at least one of: the QoS model used by each of the flows of network traffic along that route; and the characteristic of each of the flows.

If reservations have been used to allocate resource to Classes of Service in routers and links, we also propose further that resources that have been allocated to models that are discontinued can be reallocated to other models to improve their performance. This decision may be made based on performance monitoring of those other models.

Performance of traffic flows which use QoS models may be monitored, and if the performance of a QoS model is below an acceptable standard, the QoS model may be withdrawn from one or more routes. The resources allocated to the model that has been withdrawn can then be reallocated to flows using other QoS models on the same route. As an alternative to withdrawing a model based on performance monitoring, a QoS model may be withdrawn due to demand, or based on desirability indicators associated with the model.

It will be appreciated in the context of the present disclosure that data describing a plurality of QoS models may be obtained, e.g. from a Gatekeeper. Each QoS model may comprise at least one QoS component specifying a characteristic of network traffic to be provided by the QoS model. Network traffic may then be monitored to obtain a plurality of indicators, each indicating a characteristic of the network traffic associated with the one of the plurality of QoS models that is associated with that traffic.

As noted above, the reallocation of resources on a route may be based on the QoS model. For example it may be based on a resource allocation parameter of the QoS Model, such as: the bandwidth allocated to the QoS model; the bandwidth being used by the QoS model; the number of flows of network traffic which use the QoS model; the type of traffic using the model; and the energy usage of the model. Any one or more of these parameters may be used to make this decision.

It will be appreciated in the context of the present disclosure that when a client wishes to send a flow of traffic through a network it may negotiate a class of service for that traffic. Embodiments of the disclosure comprise negotiating, with a client, to determine a class of service for flows of network traffic along the selected route, and determining, based on the negotiating, demand statistics associated with QoS models which are available in the network. In these embodiments the reallocation may be based on the QoS model used by each of the flows in the sense that the reallocation is based, at least in part, on these demand statistics.

Negotiating may comprise receiving a query message from a client specifying a class of service for the transport of network traffic along the selected route, transmitting, to the client a query response message offering at least one QoS model; and receiving, from the client, a reservation request specifying one of the at least one QoS models.

The demand statistics may comprise at least one of a number of reservation requests which specify the QoS model, and a number of said reservation requests that are rejected; a number of query messages which request a class of service which matches the QoS model.

QoS models in use on any given route, or collection of routes, may be withdrawn, for example if the monitoring indicates that the routes associated with the model are not providing QoS at the level promised by the model or if the routes are otherwise not complying with the QoS model— e.g. by providing performance which exceeds the class of service associated with the model. The indicators used to monitor performance in the methods of the present disclosure may comprise one or more of: stability indicators, volatility indicators and other indicators.

At the time a QoS model is offered, it may be offered with a service level agreement (SLA) of some kind, such as a confidence interval indicating the spread of the QoS components that a client can expect to be provided by the QoS model. For example, a QoS model, P, may be associated with a performance envelope p±c, where p is a vector of values specifying the model prototype and c is a confidence vector indicating the expected variation in the QoS components specified by the model prototype p. To monitor SLA breaches, the indicators obtained from the monitoring may each comprise the number of routes that deviate from the QoS model with which they are associated by more than a selected threshold deviation. This threshold may be based on the confidence vector associated with the corresponding QoS model. Such indicators may provide an indication of the number of routes which breach the service level agreement (SLA) for the QoS model. This may be done by computing the time average QoS vector q for each traffic flow assigned to a QoS model P. It can then be determined whether the time average of the QoS vector q lies within a confidence interval of the model prototype, and if not how many flows have a time average q which breaches the performance envelope, p±c, specified by the model and its confidence interval. Other agreed performance envelopes may be used to determine whether the traffic flows assigned to that model match expectations for the QoS model, or if there has been an SLA breach. If more than a selected number of routes breach the SLA, the model may be deemed no longer to be available, and so be withdrawn from advertisement in query response messages. This may be done by excluding it from the subset of QoS Models that are to be offered for use in query response messages transmitted from the gatekeeper.

The ability to provide performance which complies with a QoS model may be dependent on the traffic flow characteristics of the routes associated with that QoS model. To monitor these characteristics for the QoS model as a whole, the indicators may also comprise the characteristic of the network traffic aggregated over a plurality of flows of network traffic associated with the QoS model, P. For example, the average QoS vector, Q, may be computed over some or all flows for a QoS model. It can then be determined whether these computed values, calculated across the actual traffic flows of the network which are attributed to that QoS model, lie within the confidence interval specified by the QoS model itself. If that is not the case we consider the prototype of the QoS model, P to have drifted away and so the model can be withdrawn from advertisement in query response messages.

Another characteristic of the actual traffic flows attributed to a model is their ability to provide defined performance. Just as the average QoS, Q, may be calculated across a plurality of flows, a confidence vector, $c_q$, may be determined from the spread (e.g. the variance) of QoS performance computed from the monitored traffic flows. The values in this confidence vector may be used to provide an indication of the stability of the QoS model. One way to achieve this may be by determining whether confidence vector, $c_q$, determined from the monitored flows exceeds an expected threshold. For example, the expected threshold may be based on the model prototype, p. For example, the threshold for each component of the confidence vector may be a selected fraction of the model prototype. In other words, in the event that the confidence vector, $c_q$, calculated from the traffic flows exceeds some permitted fraction of the model prototype, p it may be withdrawn from advertisement in query response messages.

Stability indicators may also be used to determine which QoS models to include in the subset of models that are advertised in query response messages at the gatekeeper. Such stability indicators may be determined by comparing the monitored network traffic with the corresponding one of the plurality of QoS models, for example by counting the number of times a difference between the actual performance of a monitored traffic flow exceeds an expected deviation associated with the QoS model. This may be done over a particular time interval, for example the count may provide a measure of the frequency of SLA breaches. This measure of stability may be aggregated over all flows of the QoS model and/or over all components specified by the model.

In an embodiment the monitoring comprises collecting data about a plurality of flows of network traffic associated with each of the plurality of QoS models. In an embodiment the indicator comprises a value of the characteristic specified by the each QoS model, the value being determined based on the collected data. In an embodiment the method comprises determining, based on the data, a QoS vector qi for each of the plurality of flows assigned to that QoS model, and determining an average QoS vector Q for that QoS model based on an average of the QoS vectors qi for each of the plurality of flows. In an embodiment the method comprises determining whether to exclude that QoS model from the subset based on whether the average QoS vector Q lies within a confidence interval associated with that QoS model. In an embodiment the method comprises determining, based on the QoS vectors, $q_i$, for each of the plurality of flows, a confidence vector cq and determining whether to exclude that QoS model from the subset based on one or more components of this confidence vector $c_q$. The determining whether to exclude may be based on comparing the one or more components of the confidence vector with a corresponding component of that QoS model, for example comparing the one or more components of the confidence vector with a selected fraction of the corresponding component of that QoS model. The embodiments outlined above may be directed to the issue of managing model performance, and withdrawing those models whose performance does not match SLAs.

Other embodiments are directed to the issue of how to promote desirable characteristics of network traffic.

Desirability indicators may be determined based on monitoring the network traffic associated with the corresponding QoS models. Such desirability indicators may be based on a cost (such as an energy, resource, or revenue cost) associated with the corresponding one of the plurality of QoS models. They may also be based on an aggregate determined for some or all flows in the network (or just a long a particular selected route) which are associated with a QoS model. These desirability indicators may be used to determine which QoS models are to be advertised in query response messages sent to clients, and which are to be withdrawn from use (for example by no longer being advertised). The indicators may also be used to determine how to reallocate resources between traffic flows in the event that one or more QoS models are withdrawn.

More than one desirability indicator may be used. For example, the method may comprise determining a second desirability based on a different desirability indicator metric than the first desirability indicator. These indicators may be numeric indicators, and may be combined so as to attach selected weightings to each of the different desirability metrics. Where non-numeric indicators are used they can be combined using logical operations, or converted to numeric values. This may be used to promote QoS models having particular characteristics.

The desirability indicators may be fixed, or may be updated based on external data associated with network conditions or the cost of resources associated with the QoS models, and/or they may be determined based on the monitoring of network traffic. For example, they may be based on a count of events or based on time averages determined from monitoring of traffic during a selected time interval.

The desirability indicators may be determined based on at least one of: an identifier of a client associated with the network traffic; and secondary data assigned to the network traffic. The secondary data comprises at least one of: a metric of adverse impact to other services; a metric of the stability of routes followed by that traffic through the network; an amount of data communicated by the network traffic; a congestion indicator; and a cost metric. The congestion indicator may be based on detecting the number of congestion events. Congestion events may be defined as a greater than threshold packet delay, or a greater than threshold percentage of packet loss.

In an embodiment the method comprises using both a desirability indicator and a performance indicator to assess which QoS models to maintain or withdraw, and also to determine how to reallocate resources. Accordingly, the method may comprise monitoring network traffic to obtain a plurality of performance indicators, each indicating a characteristic of the network traffic associated with a corresponding one of the plurality of QoS models. This performance indicator may then be used to select the subset of models that are to be advertised at the Gatekeeper. For example, models may be selected for withdrawal by making a selection based on the performance indicators before making the further selection based on the desirability indicators, for example wherein each selection comprises withdrawing at least one of the plurality of QoS models.

The performance indicator may comprise a number of routes associated with the corresponding QoS model having a characteristic which deviates from the corresponding QoS model by more than a selected threshold deviation. For example, the threshold deviation may be selected based on a confidence vector associated with corresponding QoS model. A QoS model may be withdrawn in the event that it comprises more than a certain number of routes which exceed the threshold deviation.

Embodiments of the disclosure provide network devices configured to perform any one or more of the methods described herein. Examples of such network devices include a Gatekeeper, an edge router, and any network device capable of processing and routing packets. Such a device may comprise a communication interface for sending and receiving messages, some data storage for storing routing information, QoS models and QoS related data and a processor configured to perform any one or more of the methods described herein.

For example, in an aspect there is provided a network device comprising a processor coupled to control a communications interface for sending and receiving network packets and/or for sending control signals such as resource allocation messages to other network devices. The processor is configured to: select a route in the network, wherein the route comprises a plurality of flows of network traffic; obtain model-to-route mapping data identifying a plurality of QoS models, wherein each QoS model is used by at least one of the plurality of flows of network traffic; obtain data based on monitoring the plurality of flows of network traffic; and to use the data to determine a characteristic of each of the plurality of flows of network traffic. The processor may also be configured so that, in the event that one of the QoS models is withdrawn, it determines a reallocation of the resources of the selected route to the flows of network traffic along that route, for example to divide the available resources between the flows of traffic which continue to pass along that route. The reallocation may be based on the QoS model used by each of these remaining flows of network traffic along that route. It may also be based on the characteristic of each of the flows. The processor may control the communication interface of this network device to send a resource allocation message to other network devices. This resource allocation message comprises data configured to cause the other network devices to allocate resources to the flows of network traffic according to the reallocation determined by the processor. As an alternative, in the event that the network device is itself used to transport the flows of network traffic, the processor may control the communication interface to allocate resources to the transport of the flows of network traffic according to the reallocation. Such a reallocation may be based on any one or more of the methods described herein. It will be appreciated in the context of the present disclosure that where reference is made to "obtaining" data, this may comprise retrieving that data from memory, or receiving the data in a network message, or determining the data (for example based on monitoring network traffic and/or performing calculations).

Embodiments of the disclosure also provide tangible non transitory computer readable media storing computer readable instructions configured to program a processor of a network device to perform any one or more of the methods described herein. Embodiments of the disclosure also provide computer program products comprising program

BRIEF DESCRIPTION OF DRAWINGS

FIGS. 2A and 2B give examples of QoS feature vectors and confidence vectors that may be used to define QoS models;

FIGS. 2C and 2D give examples of tables comprising QoS model information and model-to-route mapping information;

FIG. 5 illustrates an example of performance indicator data;

FIG. 6 illustrates an example of desirability indicator data; and

SPECIFIC DESCRIPTION

Figure 1:
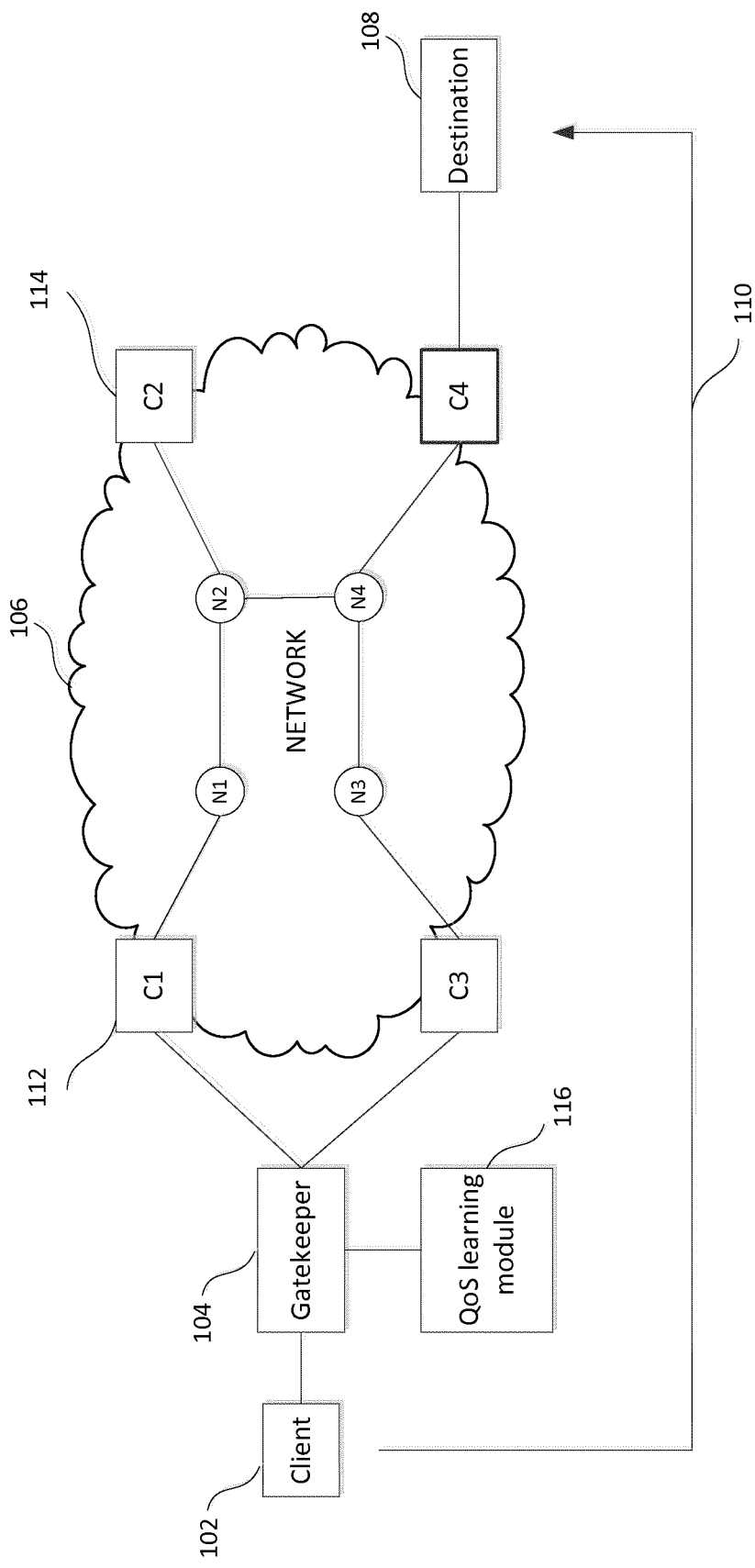
FIG. 1 illustrates a system for transmission of data flows across a network based on negotiated quality of service (QoS) metrics.

FIG. 1 illustrates a network 106 and an apparatus comprising a Gatekeeper 104, and a QoS Learning Module 116. A client 102, e.g. an entity wishing to send a flow of data, is coupled to a destination 108 by the apparatus 104, 116, and the network 106.

The apparatus 104, 116 and the network 106 are arranged to advertise a set of available QoS models to a client 102 to enable the client 102 to select from amongst those QoS models. The packets of the client's data flow 110 can then be labelled with an indicator of their selected QoS model (for example by using a differentiated services, DS, field of the packet). The network is configured so that those packets will then be transported through the network 106 according to that QoS model.

The Gatekeeper 104 is configured to provide an interface between the network and the client 102 (a user wishing to send traffic across the network). This interface may allow the client 102 to negotiate desired transport parameters for the traffic they wish to send. In this regard, the Gatekeeper 104 is configured to provide "scoreboard" data to clients. This "scoreboard" data advertises the available QoS models, and identifies the Differentiated Services Code Point, DSCP, values which are used to identify the routes through the network which offer performance according to each of those QoS models. The Gatekeeper 104 may be provided at an edge router, a session admission unit, a bandwidth broker or at a network installed generic interface between a client 102 site and the network itself.

Embodiments described with reference to FIG. 1 may enable the QoS models advertised to the client 102 by the Gatekeeper 104 to be kept up-to-date. This may be done by removing QoS models from the advertisement provided to clients if (a) the actual performance of the QoS model does not match the QoS specified by the model; and/or (b) if other QoS models are more 'desirable'; and/or (c) if there is redundancy between QoS models.

FIG. 1 shows a network comprising a number of edge nodes C1-C4 and internal nodes N1-N4. The edge nodes are coupled together via the network, for example via the internal nodes N1-N4. The edge nodes C1-C4 are also arranged to provide communications to and from the network. The network can thus provide various routes for carrying network traffic (e.g. data flows) between pairs of edge nodes C1-C4. These routes may pass through one or more of the internal nodes N1-N4. For example, a first route from a first edge node C1 may pass through a first group of nodes to reach a second edge node C2 whilst a second route from that first edge node C1 may pass through a second group of nodes to reach the second edge node C2. The second group of nodes may be different from the first group of nodes. For example, the first route may be C1-N1-N2-C2, and the second route may be C1-N1-N2-N4-C4-C2 etc. As will be appreciated by the skilled person in the context of the present disclosure, more than two such routes may be available between any pair of edge nodes. Each of these routes may have different performance characteristics, for example in terms of packet loss or delay. The performance characteristics of any given route may vary over time—for example performance characteristics may be dependent upon time-varying network conditions such as power availability and network load. When the client 102 wishes to send traffic across the network it obtains data identifying the available QoS models from the Gatekeeper 104. The client 102 can then select a QoS model according to the needs of the traffic it wishes to send and obtain, from the Gatekeeper 104, a DSCP value which can be used in the network to identify that QoS model. The client 102 then sets a differentiated services, DS, field in each packet based on this DSCP value before sending the packets across the network. The DS field indicates the QoS model that is to be applied to that packet in its transmission between network components. The network is configured to provide data transmission in accordance with various distinct Quality of Service (QoS) models. Each QoS model in effect defines a Class of Service (CoS) that may be applied to traffic transported on the network. QoS models define bounds on various QoS metrics, such as packet loss. For example, one QoS model may define a particular maximum value for packet loss whilst another may specify a maximum packet delay. A single model may also combine multiple QoS metrics, such as packet loss, packet delay and jitter.

Some QoS models may be predefined. For example, the network may provide a standard set of DiffServ classes of service such as Default PHB (typically best-effort traffic), Expedited Forwarding (EF) PHB (low-loss, low-latency traffic) and Assured Forwarding (AF) PHB (where PHB denotes per-hop-behaviour).

In a general mode of operation of the network illustrated in FIG. 1, each time a client wishes to transport a data flow through the network it sends a query message to the Gatekeeper 104. The query message specifies one or more QoS requirements—the QoS constraints that the client wishes to be applied to a traffic flow. The Gatekeeper 104 identifies QoS models matching the identified requirements, and provides information about the matching models in a response message to the client. If required, the query and response may be repeated one or more times, for example the client may revise its requirements based on the QoS models available to it. The client can then send a reservation message to the Gatekeeper 104. The reservation message identifies one or more of the available QoS models to select those models for the data flow. The Gatekeeper 104 then identifies and reserves (if possible) network resources for the data flow based on the selected QoS model(s). This may involve identifying suitable network routes and allocating bandwidth on those routes. The Gatekeeper 104 also allocates a distinct CoS identifier for the data flow and sends a response to the client indicating the allocated CoS identifier. The CoS identifier (e.g. in the form of a DSCP as discussed below) is subsequently used by the client to label traffic for the data flow. The Gatekeeper 104 or another network component (e.g. edge router) receiving data packets for the flow labelled with the CoS identifier, can then identify the agreed QoS metrics and/or allocated resources for the packets from the CoS identifier and route them through the network accordingly. It can thus be seen that the apparatus 104, 116 is arranged to receive a query message from a client requesting transport of a data flow through the network with a particular QoS model.

Not all QoS models need be predefined. The QoS Learning Module 116 (also referred to as a performance modeller, PM) may be configured to classify traffic routes through the network into one of a selected number of clusters. The QoS Learning Module 116 can also assign DSCP value to a cluster of such routes, and determine a QoS model that describes transport along that cluster of routes. Each cluster of routes may thus be described by a QoS model, and identified by a DSCP value. This so-called "cluster driven" approach to assigning QoS models is discussed in more detail below.

In a "cluster-driven" approach, QoS models may be identified by discovering cluster centres by monitoring route performance. Such monitoring can identify routes which share common performance features (e.g. similar packet delay). Where such performance features are common to a plurality of routes in the network, they can be grouped into a "cluster", and the QoS parameters which describe the performance features which those routes have in common describe the QoS model that that cluster of routes offers in the network.

Cluster driven QoS model selection, in contrast to using only predefined models, operates by monitoring performance characteristics of flows of data through the network to identify classes of service that the network can support. This process may be made dynamic by an iterative learning process, in which various QoS metrics are measured for actual flows traversing the network. For example, a given flow may be associated with a performance metric vector $p=\langle m\_1, m\_2, \ldots m\_n\rangle$. Each metric corresponds to a different feature of the flow (e.g. packet delay, packet loss, jitter etc.). The QoS Learning Module 116 then performs a clustering analysis on the measured metric vectors to identify representative metric vectors that indicate distinct network behaviours (these are referred to as prototypes). The representative metric vectors then form the basis of a dynamic set of QoS models that can be made available for use. For example, if the clustering algorithm identifies a number of flows that achieve similar levels of packet loss and similar levels of packet latency, a QoS model can be defined specifying the given loss and latency levels (e.g. as bounded ranges, or just upper limits). This QoS model can be made available for use by future packet flows, since the system knows from the observed prior behaviour that the network can support traffic with those characteristics. To determine the QoS models, the QoS Learning Module 116 may be configured to observe the traffic routes through the network (e.g. using telemetry data which may be forwarded over the network), and to determine Class of Service parameters for each route such as jitter, packet loss and packet delay. In other words, the QoS Learning Module 116 is operable to cluster the traffic routes based on these Class of Service parameters so that the routes in any given cluster can be characterised by a measure of central tendency in these parameters for that cluster of routes (e.g. a time average over a selected time interval, wherein the average may comprise a mean, median or mode). The QoS Learning Module 116 may also be configured to determine a measure of the deviation of these parameters amongst routes in the cluster (examples of measures of deviation include confidence intervals, quantiles, variance, standard deviation and higher order statistical moments). The QoS model may comprise a three-dimensional performance based model comprising jitter J, loss L and delay D. Accordingly, each such model $P_i$ can be characterised by a prototype vector $pi=(\bar{j}_i, \bar{l}_i, \bar{d}_i)$ and a confidence interval vector $c_i=(cj_i, cl_i, cd_i)$. The prototype vector $p_i$ specifies the typical or average performance and the confidence vector $c_i$ specifies a confidence interval $p\pm c$ for each component p of $p_i$. An example of a confidence interval is a 99% confidence (e.g. 99% of the expected distribution will lie within $\pm c$ of the vector p, but other confidence intervals can be used).

FIG. 2A illustrates a set of prototype feature vectors. Here, each prototype vector includes metrics for the "jitter", "loss" and "delay" features. Whether or not the QoS models are predefined (or determined from a cluster driven approach as described below), the models may comprise data indicative of the spread of performance values across an identified cluster of which the prototype vector is representative. For example data indicative of spread may specify an expected deviation, perhaps in terms of confidence intervals.

FIG. 2B illustrates a set of 99% confidence intervals for the prototype vectors of FIG. 2A. Together, a prototype vector and associated confidence vector can be used to specify the performance characteristics of a given QoS model.

FIG. 2C illustrates an example of a data table maintained by the system listing details of QoS models including prototypes, confidence intervals, available data capacity for each model, along with various statistics for the models. Each metric corresponds to a given feature of a traffic flow or of a QoS model.

When "learning" a QoS model, or monitoring flows which use a QoS model, the system keeps a record of all routes that support the model (i.e. the routes carrying the data flows which were the basis for the model). Thus, in addition to the model definitions themselves, the learning process can produce a mapping that maps QoS models to routes. An example of a table providing such a mapping is illustrated in FIG. 2D. This mapping can be used to provide the "scoreboard" data advertised to clients at the gateway.

Clustering may be performed on any available number of features, so that the learnt QoS models may specify constraints on all features or on any subset of available features, leaving other features unspecified. The feature specification of a QoS model may be considered to constitute a form of Service Level Agreement (SLA), specifying the service level expected when transporting a data flow across the network. The features and associated metrics of a QoS model can relate to any measurable quantities associated with the network and how traffic is carried across the network. This includes both "hard" performance metrics, such as packet loss, packet jitter and packet delay, as well "soft" metrics such as:

energy consumption (e.g. an estimate of the energy consumed by carrying a packet or flow over a given route)
  a cost value representing a financial cost involved in transport of a packet or flow across a route
  resilience (e.g. an expected rate of failure along a route, for example due to hardware failures, routers crashing and the like)

Some metrics (especially "soft" metrics e.g. cost), may be represented as a set of value bands rather than as a continuum of values, which can enable derivation of more useful and representative QoS models.

If dynamic updates of QoS models are desired, the QoS Learning Module 116 can continue to monitor data flows in the network, and repeat the described learning process at intervals (e.g. periodically or in response to some change in network conditions, or on an ad hoc basis). As a result the set of available QoS models may evolve over time, adapting to resource availability and demand in the network. However, such a dynamic system can make it more difficult for clients wishing to reserve resources for data flows to know what performance characteristics can be supported by the network at any given time. Furthermore, it may be the case that no single QoS model accurately represents the service characteristics desired by the client 102 at that time. A large number of QoS models may be discovered in this "cluster driven" manner.

The gateway can reduce the number of advertised QoS models to manage the number of models that are in use at a given time. In contrast to models which may be offered only to specific clients, this may enable general model management to be applied to all models available in the network. To reduce the number of advertised models, a subset of the available QoS models are selected from the large number of QoS models that might be generated by a "cluster driven" approach in a dynamic QoS environment. The gateway can then advertise only that subset to clients—e.g. only selected models may be made available on the "scoreboard".

The subset of models to be advertised by the gateway may be selected from the available set of QoS models based on criteria including one or more of the following:
1) Predictive model performance and stability.
2) Optimization of models based on desired traffic features.
3) Simplification of multiple models by reducing dimensionality.

Once the available models have been identified, the selection of a subset of those models for advertisement at the gateway may be performed by the QoS Learning Module 116. This selection may be performed according to one or more of the set of criteria mentioned above.

Figure 3:
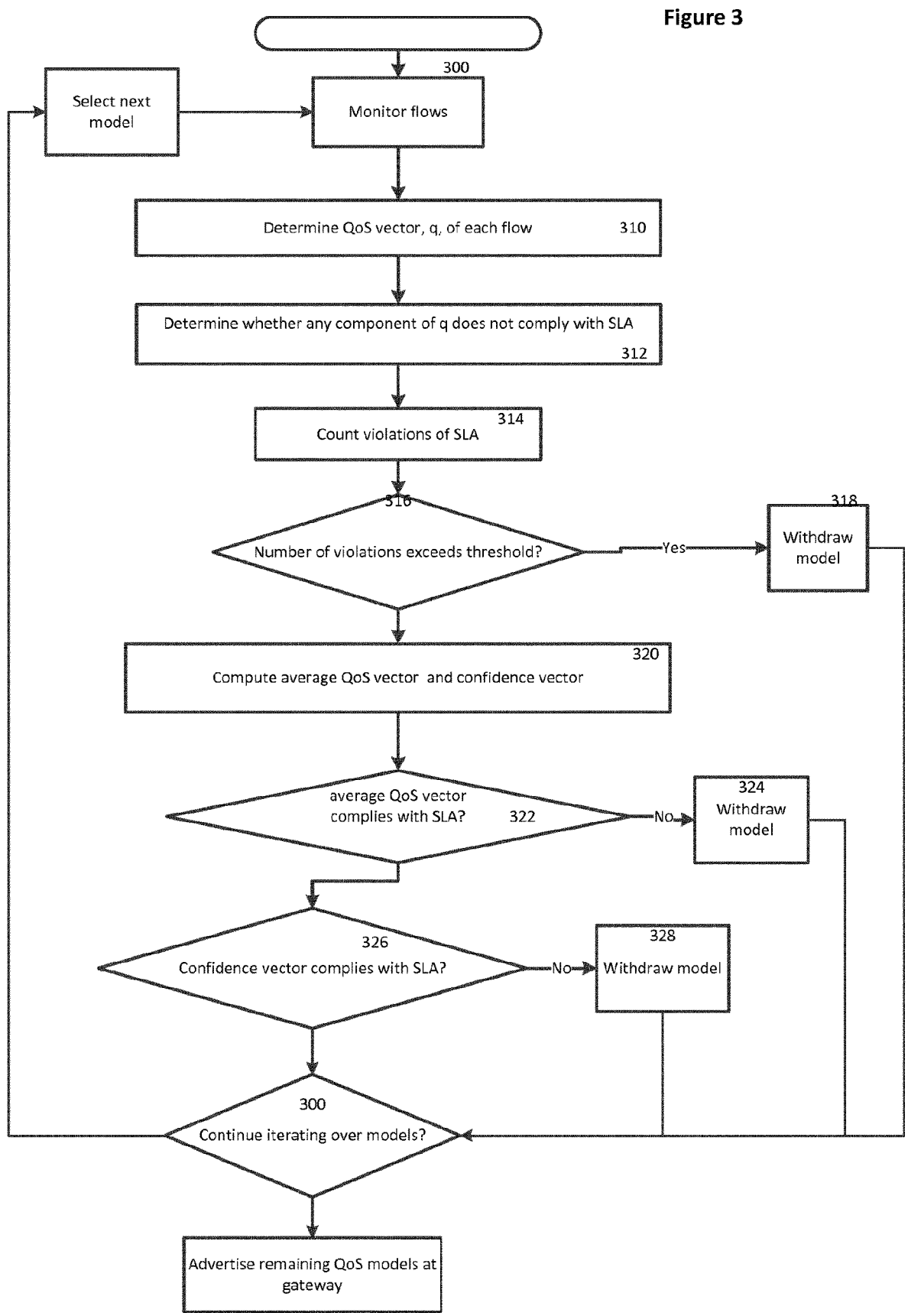
FIG. 3 illustrates a method of providing QoS models for use in a network.

FIG. 3 illustrates the selection of QoS models based on model performance and stability. According to methods such as those illustrated in FIG. 3, a QoS model may be retained, and advertised to clients at the gateway, only if the routes associated with that QoS model meet the performance requirements of the model to within selected tolerance limits—such as may be specified in a Service Level Agreement, SLA, between the network operator and the client 102. In the event that a QoS model does not meet this performance criterion it may be withdrawn by being excluded from the subset of QoS models that are made available to clients—e.g. it may no longer be advertised at the gateway.

One example of such a performance metric is the number of routes in the QoS model which are determined to deviate from the prototype, p, of the QoS model (cluster centre) by more than expected based on the confidence vector associated with that QoS model. In the event that more than a threshold number of routes exceed this deviation, the QoS Learning Module 116 may withdraw the QoS model from advertisement at the Gatekeeper. Another example of a performance based criterion is model stability. For example, the QoS Learning Module 116 may store data indicating the SLA associated with a QoS model, and may count the number of SLA breaches (failure to provide class of service within the SLA). This may identify models which oscillate between conformance to SLA and divergence from SLA over time, but which might do so without a large number of routes in the QoS model deviating from the prototype. Some or all of these performance criteria may be applied, and they may be applied in any selected order.

FIG. 3 illustrates one example of these performance criteria being combined. In this example, the QoS Learning Module 116 may monitor 300 the performance of each QoS model. This may be done at a specified time granularity (e.g. every 5 minutes, every hour etc.) according to network operator's preferences. This monitoring may comprise recording the number of flows using a particular model and their individual performance over a selected time interval. The aggregated performance of those flows and/or the individual performance of those flows over that time interval can be used to determine whether to advertise the associated QoS model at the gateway.

As illustrated in FIG. 3, the QoS Learning Module 116 monitors 300 each of the flows assigned to a specified model, P, for the selected time interval. During that interval, the QoS Learning Module 116 collects data indicating the performance of each of these flows against the QoS components offered by the model P. For example, if the model P is defined by reference to jitter, loss and packet delay, then the QoS Learning Module 116 collects that data about the cluster of flows assigned to that model. If however the model offers other components, then data indicating those components can be collected. Based on this data, the QoS Learning Module 116 then determines 310 a QoS vector, $q_i$ for each monitored flow during that time interval.

The QoS Learning Module 116 then determines 312, for each QoS vector, $q_i$, whether any component of the QoS vector, $q_i$, does not lie within the performance envelope agreed with the client 102 for the specified model P. For example—the agreed performance envelope of P may be based on the prototype, p, and the confidence vector, c. In this case, the QoS Learning Module 116 may determine whether the QoS vector, q, of each flow lies within the confidence interval specified by the QoS model prototype and confidence vector, p±c. This can be used to determine whether performance provided by flows under the model meets expectations for the QoS model, P, and to detect if there has been an SLA breach, e.g. if at least one component of $q_i$ is worse than the agreed threshold for that component. The QoS Learning Module 116 can also identify routes assigned to the model which exceed the SLA (e.g. provide better performance than the QoS standard specified by the model prototype and confidence). The QoS Learning Module 116 determines the number of such breaches (violations of the SLA) in a time interval 314. The QoS Learning Module 116 can then determine 316, based on the number of violations of the SLA (through under performance, or over performance, or both)—whether to withdraw the model from being offered by the gateway. In the event that there have been more than a selected number of breaches during this interval, the QoS model may be withdrawn 318.

The QoS Learning Module 116 can also determine 320 the average QoS vector Q. This may be done by computing the average of the QoS vectors $q_i$ of each of the cluster of flows assigned to that model. The QoS Learning Module 116 then determines 322 whether the average QoS vector Q lies within the confidence interval around the prototype of the QoS model P, e.g. is Q within the bounds of the model p±c? If that is not the case the QoS model may be withdrawn 324.

The QoS Learning Module 116 can also determine the confidence vector $c_q$ associated with the distribution of QoS components associated with each of the flows (the components of the QoS vectors $q_i$) about the average QoS vector Q. The QoS Learning Module 116 determines 326 whether one or more components of this confidence vector meet a selected condition. For example, the condition might be based on the prototype. For example the condition may be that one or more components of the confidence vector $c_q$ associated with the distribution is less than a selected fraction of a corresponding component of the QoS model's prototype, p—e.g. $c_q < xp$, where x is a fractional deviation from the prototype. In the event that the confidence vector of this distribution does not meet this condition, the model may be deemed unacceptably 'volatile' and so withdrawn 328.

Figure 4:
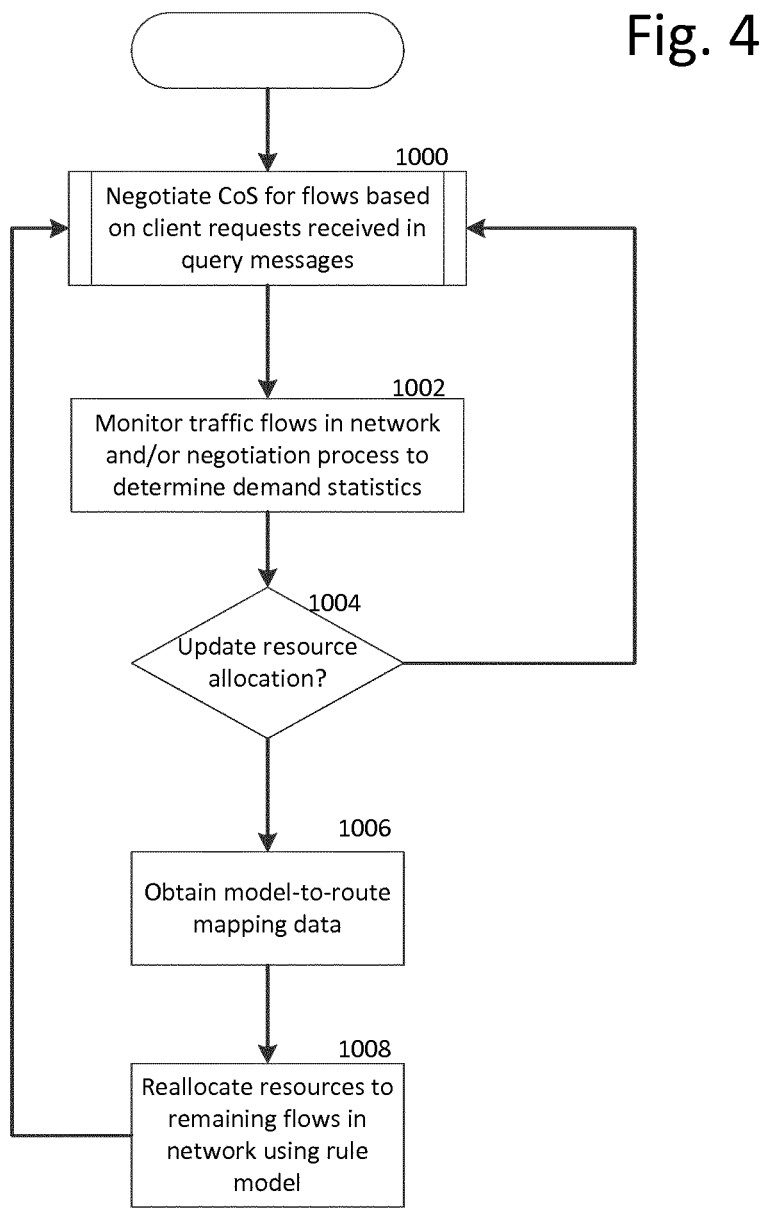
FIG. 4 illustrates an example of a method of reallocating resources on a route through the network in the event that a QoS model is withdrawn.

FIG. 4 illustrates a method which provides a reallocation of resources between flows of network traffic in response to the withdrawal of one or more QoS Models from the network.

The method illustrated in FIG. 4 begins with a negotiation 1000 between the Gatekeeper and a client. The purpose of the negotiation 1000 is to determine a class of service for flows of network traffic through the network.

In this negotiation, a query message 1000 is received from a client specifying a class of service for the transport of network traffic. A query response message is then transmitted to the gatekeeper offering at least one QoS model which matches (or approximates) the class of service requested in the query message. Based on this response, and the offered QoS models, the client 102 may respond by sending a reservation request specifying one of the at least one QoS models.

As illustrated in FIG. 4, the QoS Learning Module 116 monitors requests received for QoS at the Gatekeeper 104 (in the form of query messages and or reservation messages). The QoS Learning Module 116 may monitor 1002 these requests to assemble demand statistics indicating the frequency with which client 102 requests a class of service which matches one of the QoS models. This monitoring 1002 may comprise monitoring the flows of network traffic may also be monitored to determine characteristics of each of the plurality of flows. These characteristics may comprise any one or more of the characteristics used for the performance monitoring of QoS models as described above, and/or may also comprise a desirability indicator of the traffic, or a client identity or some other characteristic.

The QoS Learning Module, or another network device, may be responsible for the allocation of bandwidth and other resources along the various routes through the network. At intervals (e.g. periodically or in response to a trigger of some kind such as the withdrawal of a QoS Model) it determines 1004 whether to review and adjust the resource allocation along one or more of the routes through the network. It will be appreciated in the context of the present disclosure that each such route may carry a number of flows of network traffic. It is thus possible to obtain 1006 model-to-route mapping data which identifies the QoS models being used by each of the flows of network traffic along any particular route. For example, this data may be obtained from a routing table, or by inspecting packets and checking the class of service indicator carried by the packets.

In the event that one of the QoS models is withdrawn, the flows of traffic which use the withdrawn model may end, and the resources previously used to carry flows using that model may be reallocated 1008 to the flows of traffic which remain in use on a particular route. The reallocation may be based on the QoS model used by each of the flows of network traffic along that route; and/or the characteristics of each of those remaining flows. For example, this reallocation may be based on a rule base which takes into account a resource allocation parameter of the QoS Model. The resource allocation parameter may comprises at least one of:

the bandwidth allocated to the QoS model;
the bandwidth being used by the QoS model;
the number of flows of network traffic which use the QoS model;
the type of traffic using the model;
the energy usage of the model.

It will also be appreciated that the negotiation between Gatekeeper and client described above can be monitored to determine demand statistics associated with the plurality of QoS models. In these embodiments the reallocation can be based on the QoS model in the sense that it is based on the demand statistics for that QoS model. Such demand statistics may comprise at least one of a number of reservation requests which specify the QoS model, and a number of said reservation requests that are rejected; a number of query messages which request a class of service which matches the QoS model.

If reservations have been used to allocate resource to Classes of Service in routers and links, resources that have been allocated to models that are discontinued can be reallocated to other models to improve their performance. This is especially relevant if a single route carries several classes of service at the same time, i.e. multiple MPLS tunnels in the same route or multiple DS-TE sub-pools in the same tunnel, each of which carries a different type of traffic. The choice of models to which freed resources may be apportioned can be made in two ways:

a) Allocate the resource to the model with the highest desired traffic to encourage more traffic of the same type to be admitted. This assumes that such traffic will arrive in the future without knowledge of whether this is the case. Taking the example of revenue maximisation, any freed up resource on a route can be allocated to the model that is currently making the most revenue irrespective of how much traffic it carries or to the model that makes the most revenue per unit of traffic.

b) Allocate the resource to the model with the most prospective class of service, based on client requests. Requests made by clients are stored by the gatekeeper and accessible by the learning component to determine which CoS are likely to be popular, taking into account how many requests had been rejected due to resource unavailability and therefore allocate resources to such models to increase the desired traffic behaviour.

These two approaches are optional and may not be used in some embodiments.

The network device responsible for the reallocation identifies the available resources (e.g. unused bandwidth) on any particular route, such as the resources associated with a withdrawn QoS model, and then determines how to allocate these resources to remaining flows of network traffic along the route.

This may be done by applying a reallocation rule base to decide how to distribute the resources from the withdrawn model to the remaining models on the route. This rule base can be implemented in a variety of ways. We propose to use a fuzzy rule base. Fuzzy rules may have the advantage that they can easily express linguistic expression like "low resource", "high demand", "many flows" etc without the necessity of defining exact thresholds. Fuzzy rules can also be improved through learning processes (neuro-fuzzy systems). Since fuzzy rules are a generalisation of normal or crisp rules, they can conveniently combine fuzzy and non-fuzzy elements within a single rule. The creation and the training of fuzzy rule bases will be appreciated by those skilled in the art having read the present disclosure.

The rule base can include rules like:

If the rejected demand is high and the available bandwidth is low then increase bandwidth. If the available bandwidth is high and the number of requested flows is low then decrease bandwidth etc.

By running all models on a route through the rule base we obtain a number of increase/decrease labels per rule which can be used to rebalance the available bandwidth between the models. This procedure is executed in regular intervals and each time a model is withdrawn from a route.

Consider a route with a bandwidth of 100 Mb/s supporting three models with the following bandwidth allocation: M1: 30 Mb/s, M2: 30 Mb/s, M3: 20 Mb/s, M4: 20 Mb/s. Model M4 is underperforming and will be withdrawn which triggers the rebalancing of resources. Applying the rebalancing rule base results in two rules requesting increased bandwidth for M1, one rule requesting increased bandwidth for M2 and one rule requesting to decrease the bandwidth for M3. Assume that a decrease request results in a decreasing the currently allocated bandwidth by 25%. That means that we have 20 Mb/s from M4 and MB/s from M3 to redistribute. Since M1 has twice as many redistribution requests as M2 has, the bandwidth should be redistributed in a 2:1 fashion resulting in 17 Mb/s for M1 and 8 Mb/s for M2 (we don't allocate fractions of Mb/s). This results in new bandwidth allocation of M1: 47 Mb/s, M2: 38 Mb/s and M3: 15 Mb/s.

The reallocation rule base can be easily created in such a way that it favours models that support types of traffic that are prioritised or more desirable for reasons like revenue, importance of clients or any other network policy. By combining non-fuzzy elements like type of traffic with fuzzy elements like "most" and "low" we can have the following rules for example:

if most traffic is of type "video" and available bandwidth is low then increase if most traffic is of type "file share" and available bandwidth is not low then decrease Other rules and types of rules may be used to determine the resource allocation.

The network device may then implement the resource allocation by sending a resource allocation message to other network devices to cause the other network devices to allocate resources to the flows of network traffic according to the reallocation.

FIG. 5 shows an extract of a performance management table which might be produced by a method such as that described with reference to FIG. 3 and/or by the monitoring 1002 described with reference to FIG. 4. As illustrated in FIG. 5 Model 1 was performing as expected at 15:00 and the only deviation from expected behaviour was that 3 flows were better than the agreed QoS. If this behaviour would persist and potentially grow, then the operator may withdraw the QoS model and replace it with a model that more accurately represents the high performance. However, it turns out that at 16.00 the model has actually become volatile resulting not only in better performance for some flows but also for SLA breaches for 2 flows. The decision would be to withdraw the QoS model at this stage or at least to consider it if the behaviour persists for a number of time slots. An example of a desirability indicator metric may be a cost metric of the traffic, such a cost metric may take into account at least one of: energy cost; bandwidth cost; financial cost; and revenue associated with that traffic.

The QoS Learning Module may determine the desirability indicator of each flow of traffic associated with the QoS model by applying the selected desirability indicator metric. This may be based on monitoring the flows over a period of time and determining the desirability of the traffic over that period—for example, if the metric is a cost metric, by logging the cost of data traffic flows associated with the QoS model.

The QoS Learning Module 116 may then determine an aggregate desirability score for the QoS model as a whole. In the case of a numerical indicator such as a cost metric, this aggregate may comprise a sum of the indicators of the flows associated with the QoS model. In the case of logical indicator metrics (such as whether certain conditions are met by the traffic flow) the aggregate may be based on some other combination operation (such as a logical AND or logical OR).

Additional desirability metrics may also be determined for the QoS model by repeating the foregoing steps using a different desirability indicator metric. The selected desirability indicator (or indicators) can be determined for each available QoS model. Once the desirability indicators have been determined for the available QoS models, the Gatekeeper, or other network device supporting traffic can determine how resources are to be allocated to flows based on the desirability indicators of each of the QoS models being applied to those flows of traffic.

Where more than one desirability indicator has been determined, the QoS Learning Module 116 may combine these indicators to provide a combined desirability score.

Desirability metrics can be based on any feature that identifies desired traffic. Each traffic flow that is mapped to a QoS model can be characterised by such a feature, for example, revenue, energy usage, type of traffic or application (if packet inspection is available), disruptive behaviour (e.g. sending more than agreed), congestion, duration of transmission, amount of data transmitted etc. These values may be aggregated by model and route and/or by model only. Such a measure may be obtained for each model on each route, or just for each model. The desirability indicator for each model may be based on this measure such that models supporting desired traffic are scored more highly (e.g. appear at the top of the list advertised at the gateway).

Models may be local, for example they may not be offered in the entire network, but only between specific source and destination addresses, or groups of such addresses. As a result, they may only be present on a small number of routes. Such models that are used only on a small number of routes may be treated differently from global models. For example, a relative measure of their desirability may be determined by dividing another computed desirability value by the number of routes a model appears on. This may enable resources to be allocated to models which are used on smaller numbers of routes even if their desirability indicator would otherwise be too low.

FIG. 6 illustrates an example of a method such as that explained above in which two desirability indicator metrics have been applied. As illustrated in FIG. 6, the two desirability metrics have been applied to each of a plurality of QoS models, each comprising at least one route. In this illustration, the first desirability indicator is the amount of data (e.g. the operator prefers QoS models that attract traffic that transmit a lot of data). The second metric shown in FIG. 6 is the percentage of traffic which suffers at least some congestion. Congestion may be defined as a greater than threshold packet delay, or a greater than threshold percentage of packet loss.

As these are both numerical metrics they may be combined numerically, for example using a metric which ranks a first metric (e.g. high data amount) as desirable, and a second metric (e.g. congestion) as undesirable. For example the measures can be combined as follows (Avg. data amount per route per hour)×(1−% traffic congested/100). If applied to the data illustrated in FIG. 6, this results in the following ranking: M2: 13.5, M1: 9, M3: 8.5, M4: 4, M5: 3.8, M6: 3.6. The model that is only applicable to two routes turns out on top because it has the best per route behaviour.

The operator can now re-allocate the resources allotted to the withdrawn models between the remaining models according to their ranking or their desirability indicator values.

To protect QoS models which may apply to only small numbers of routes, the desirability indicator metrics may be determined per route—e.g. the average desirability of each route in the QoS model. Embodiments of the disclosure may be configured to protect selected models from withdrawal (and to continue to advertise them, and/or to allocate resources to them) even in the event that they do not meet a desirability criterion such as a threshold desirability or ranking. This may protect models of local benefit, such as those which operate only on a small number of routes. The QoS Learning Module 116 may be configured to apply a different measure to these selected models (e.g. a desirability indicator which takes into account the desirability per route—such as average amount of data in a given period per route). This may enable QoS models of local benefit to be maintained whilst also managing local models in the same (or at least a compatibly similar way as the global models).

An indicator of the 'desirability' of the QoS models can be determined based on traffic being transported according to those models during a selected time interval. Desirability indicators may be determined based on at least one of: an identifier of a client 102 associated with the network traffic; and secondary data assigned to the network traffic. Such secondary data may comprise one of: a metric of adverse impact to other service, a metric of the stability of routes followed by that traffic through the network; and data selected, based on a parameter of the traffic, from a stored association. Such a stored association may indicate client 102 specific or traffic specific data, such as the application that that traffic is intended to support, or transport cost data associated with that traffic. Transport cost data may comprise energy cost and/or transport pricing associated with the traffic. This may enable particular applications, such as video conferencing or other delay sensitive traffic to be prioritised, it may also permit the desirability of traffic to be based on the financial cost of that traffic. Whatever the basis of these desirability indicators, they may be obtained by determining for each QoS model of the plurality of QoS models the desirability of traffic belonging to the each QoS model. The QoS models advertised to clients at the gateway can then be selected based on this desirability indicator.

As mentioned above, the desirability indicator for a QoS model may be based on a metric of adverse impact to other services. This metric may be obtained by monitoring network congestion after traffic using that QoS model is admitted to the network. For example, the metric may be based on the frequency of network congestion events. Network congestion events may comprise packet loss or packet delay which exceeds a threshold level.

Figure 7:
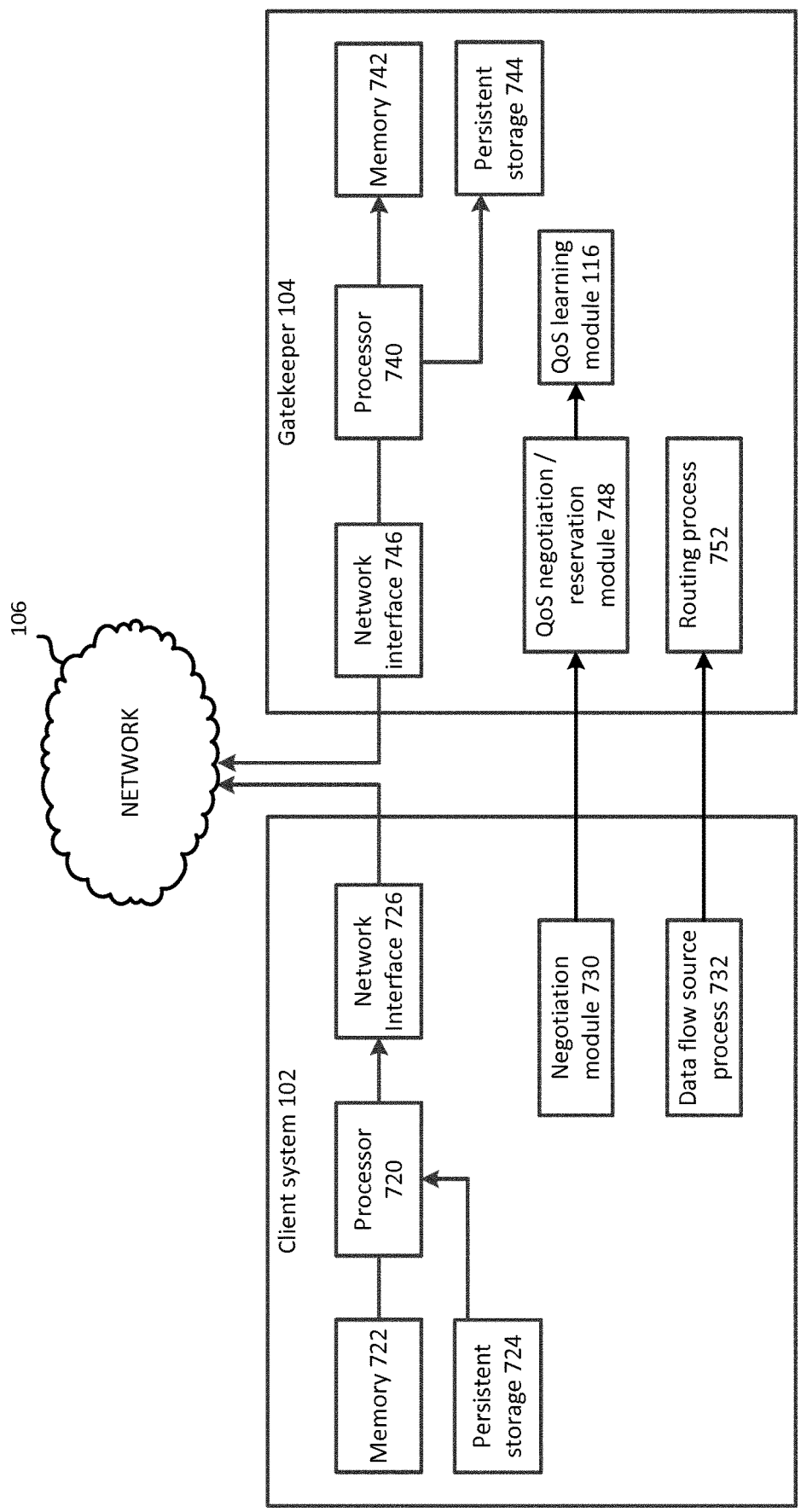
FIG. 7 illustrates network devices such as those which may be used to implement the method of FIG. 4.

FIG. 7 illustrates by way of example a possible hardware/software/firmware architecture of network devices such as the client 102 and Gatekeeper 104 components of the system. The client system 102 (e.g. a server originating a data flow that is to be transmitted across the network) includes one or more processors 720 together with volatile/random access memory 722 for storing temporary data and software code being executed. A network interface 726 is provided for communication with other system components (including Gatekeeper 104 104) over one or more networks 108 (e.g. Local or Wide Area Networks, including the Internet).

Persistent storage 724 (e.g. in the form of hard disk storage, optical storage, solid state storage and the like) persistently stores software for implementing the methods described previously, including a negotiation module 730 for participating in the QoS negotiation process and a data flow source process 732 for generating and/or forwarding the data flow that is to be subject to the negotiated QoS. The persistent storage also includes other typical server software and data (not shown), such as a server operating system.

The client system 102 may include other conventional hardware components as known to those skilled in the art (e.g. I/O devices), and the components are interconnected by a data bus (this may in practice consist of several distinct buses such as a memory bus and I/O bus).

The Gatekeeper 104 may comprise conventional server hardware, including memory 742 and persistent storage media 744 (e.g. magnetic/optical/solid state disk storage), both for storing computer-executable software code and data, one or more processors 740 for executing software and a network interface 746 for communication with external networks 108.

The processor runs software modules including the QoS Learning Module 116 which implements the learning algorithms for dynamically discovering QoS models based on monitored data flow statistics, and creates a database of QoS models and model-to-route mappings for storage e.g. in memory 742 and/or persistent storage 744.

The processor 740 further runs a QoS negotiation/reservation module 748 for implementing the Gatekeeper's negotiation and reservation functions, based on the QoS model information and route information stored in persistent storage 744 and/or memory 742. The negotiation module 748 communicates with the corresponding module 730 at client system 102 via the network to implement the described negotiation protocol.

In the case that the Gatekeeper 104 additionally performs traffic forwarding, the Gatekeeper 104 may also run routing process 752 for routing traffic tagged with a given negotiated QoS that is received from the client system 102 (in particular data flow source process 732) onto assigned routes and performing load balancing and the like. Alternatively, traffic routing based on the negotiated QoS could be performed at external routing devices (e.g. the edge routers of FIG. 1).

The persistent storage also includes other typical server software and data (not shown), such as a server operating system. The Gatekeeper 104 may include other conventional hardware components, with components interconnected via a bus, as described for client system 102. Note that where the Gatekeeper 104 implements routing functions, other conventional router software and hardware may be included, such as a set of interconnected line interface cards and a router operating system.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

There are different types of cluster analysis that can be used to learn model prototypes. One possibility is to use a centroid-based clustering method like k-means clustering or variations thereof like fuzzy c-means clustering (see for example Frank Höppner, Frank Klawonn, Rudolf Kruse, and Thomas Runkler. *Fuzzy Clustering*. Wiley, 1999). Centroid based clustering algorithms need to solve the problems of assigning initial prototypes or cluster centres and determining the optimal number of cluster centres. Initial prototypes may be picked at random from the set of training data. The optimal number of clusters can be determined by repeatedly clustering the training data with increasing number of clusters until the result does no longer improve. The quality of a clustering result can be determined by relating the intra- to the inter-cluster distances. Centroid-based clustering is however only one possible way of obtaining model prototypes representing naturally occurring groups in the QoS data of data transmissions. It will be appreciated in the context of the present disclosure that model prototypes can also be learned by other types of clustering algorithms like distribution-based or density-based approaches or by methods known from artificial neural networks like self-organising maps (see for example Rosaria Silipo. Neural Networks. In: Michael Berthold and David J. Hand (eds). Intelligent Data Analysis. Springer, Berlin, 1999, pp 217-268.) In addition to identifying prototypes through cluster analysis, the gateway may also be configured to offer predetermined QoS models—these may comprise default QoS models that a network operator wishes to offer. For these prototypes, the QoS Learning Module 116 may need only to compute confidence vectors—the prototypes themselves need not be changed through cluster analysis. It will therefore be appreciated that the routes and associated QoS models may be identified using a cluster driven approach, or they may be predetermined, or they may comprise a mixture of predetermined and cluster driven models.

The selection of models according to the criteria and metrics described herein may be performed by the QoS Learning Module 116 as described above, or by the gateway itself, or by a separate logical entity (which may comprise logic, and which may be embodied in software, firmware or a combination thereof). The selection may be performed at intervals, for example periodically. Human intervention may not be required in this process.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein, such as the QoS Learning Module 116 and the Gatekeeper 104, and the processor of any network device may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software code, electronic instructions, flash memory, optical disks, CD-ROMs, DVD ROMs, magnetic or optical cards, other types of machine-readable mediums suitable for storing electronic instructions, or any suitable combination thereof.

The functionality of any of the network devices disclosed herein (such as the QoS Learning Module 116 and the Gatekeeper 104 or the network nodes) may be provided in a single integrated unit, or it may be distributed between a number of processors, which may be arranged to communicate over a network. This may enable, for example, the processing steps of the methods described herein to be performed by devices which are distributed throughout a network—for example parts of one or more nodes of the network may cooperate to provide this functionality.

In the context of the present disclosure other examples and variations of the devices and methods described herein will be apparent to a person of skill in the art. Other examples and variations are within the scope of the disclosure, as set out in the appended claims.

The invention claimed is:

1. A computer implemented method for allocating resources to Quality of Service, QoS, models in a network, the method comprising:
   selecting a route in the network, wherein the route comprises a plurality of flows of network traffic;
   obtaining model-to-route mapping data identifying a plurality of QoS models, wherein each QoS model is used by at least one of the plurality of flows of network traffic;
   monitoring the plurality of flows of network traffic to determine a characteristic of each of the plurality of flows; and,
   in the event that one of the QoS models is withdrawn, such that the QoS model is no longer available for use, reallocating resources of the selected route to flows of network traffic along that route, wherein the reallocation is based on at least one of:
      the QoS model used by each of the flows of network traffic along that route; and
      the characteristic of each of the flows.

2. The method of claim 1 comprising determining, based on the monitoring, whether to withdraw one of the QoS models.

3. The method of claim 2 comprising obtaining data describing the plurality of QoS models, each QoS model comprising at least one QoS component specifying a characteristic of network traffic to be provided by the QoS model;
   wherein the monitoring comprises monitoring the network traffic to obtain a plurality of indicators, each indicating a characteristic of the network traffic associated with a corresponding one of the plurality of QoS models.

4. The method of claim 1 wherein the reallocation being based on the QoS model comprises being based on a resource allocation parameter of the QoS Model.

5. The method of claim 1, wherein the method comprises:
   negotiating, with a client, to determine a class of service for flows of network traffic along the selected route, and determining, based on the negotiating, demand statistics associated with the plurality of QoS models;

wherein the reallocation being based on the QoS model used by each of the flows comprises the reallocation being based on the demand statistics.

6. The method of claim 5 wherein negotiating comprises receiving a query message from a client specifying a class of service for the transport of network traffic along the selected route, transmitting, to the client a query response message offering at least one QoS model; and receiving, from the client, a reservation request specifying one of the at least one QoS models.

7. The method of claim 1 in which reallocation comprises identifying resources associated with the withdrawn QoS model, and allocating the identified resources to remaining flows of network traffic along the route.

8. The method of claim 1, wherein the indicators each comprise the number of routes associated with the corresponding QoS model in which the characteristic of the network traffic deviates from the corresponding QoS model by more than a selected threshold deviation.

9. The method of claim 1 wherein the indicators comprise the characteristic of the network traffic aggregated over a plurality of flows of network traffic associated with the QoS model.

10. The method of claim 1 wherein the indicators comprise stability indicators and each stability indicator is determined by comparing the monitored network traffic with the corresponding one of the plurality of QoS models.

11. A non-transitory computer-readable medium storing program instructions configured to program a processor of a network device to perform the method of claim 1.

12. The method of claim 1, wherein the event that one of the QoS models is withdrawn is determined when the monitoring indicates that at least one route associated with the one of the QoS models is not complying with the one of the QoS models.

13. A network device comprising:
a processor configured to:
select a route in the network, wherein the route comprises a plurality of flows of network traffic;
obtain model-to-route mapping data identifying a plurality of QoS models, wherein each QoS model is used by at least one of the plurality of flows of network traffic;
obtain data based on monitoring the plurality of flows of network traffic to determine a characteristic of each of the plurality of flows; and,
in the event that one of the QoS models is withdrawn, such that the QoS model is no longer available for use, to determine a reallocation of the resources of the selected route to flows of network traffic along that route, wherein the reallocation is based on at least one of:
the QoS model used by each of the flows of network traffic along that route; and
the characteristic of each of the flows; and
the network device further comprising a communication interface configured to send a resource allocation message to other network devices, wherein the resource allocation message comprises data configured to cause the other network devices to allocate resources to the flows of network traffic according to the reallocation.

14. The network device of claim 13 wherein the controller is configured to determine the reallocation of resources.

15. The network device of claim 13, wherein the event that one of the QoS models is withdrawn is determined when the monitoring indicates that at least one route associated with the one of the QoS models is not complying with the one of the QoS models.

16. A network device comprising:
a processor configured to:
select a route in the network, wherein the route comprises a plurality of flows of network traffic;
obtain model-to-route mapping data identifying a plurality of QoS models, wherein each QoS model is used by at least one of the plurality of flows of network traffic;
obtain data based on monitoring the plurality of flows of network traffic to determine a characteristic of each of the plurality of flows; and,
in the event that one of the QoS models is withdrawn, such that the QoS mode is no longer available for use, to determine a reallocation of the resources of the selected route to flows of network traffic along that route, wherein the reallocation is based on at least one of:
the QoS model used by each of the flows of network traffic along that route; and
the characteristic of each of the flows; and
the network device further comprising a communication interface configured to transport the flows of network traffic, and to allocate resources to the transport of the flows of network traffic according to the reallocation.

17. The network device of claim 16, wherein the event that one of the QoS models is withdrawn is determined when the monitoring indicates that at least one route associated with the one of the QoS models is not complying with the one of the QoS models.

* * * * *